C. I. ZIMMERMAN, DEC'D.
J. G. ZIMMERMAN, ADMINISTRATOR.
ELECTROLYTIC CONDENSER.
APPLICATION FILED MAR. 31, 1906.
1,074,231.
Patented Sept. 30, 1913.
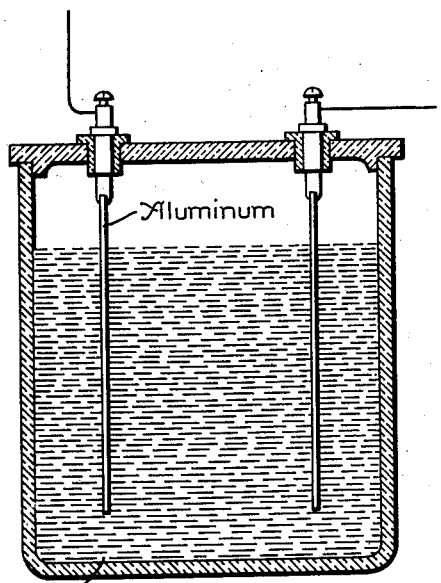
Contains an oxyacid of boron,
a borate and glycerine.
Witnesses:
Earl G. Klock.
J. Ellis Eleu.
Inventor:
Clarence I Zimmerman,
by Albert G. Davis
His Attorney.

UNITED STATES PATENT OFFICE.

CLARENCE I. ZIMMERMAN, OF NIAGARA FALLS, NEW YORK; JAMES G. ZIMMERMAN, ADMINISTRATOR OF SAID CLARENCE I. ZIMMERMAN, DECEASED, ASSIGNOR TO GENERAL ELECTRIC COMPANY, A CORPORATION OF NEW YORK.

ELECTROLYTIC CONDENSER.

1,074,231.  Specification of Letters Patent.  Patented Sept. 30, 1913.

Application filed March 31, 1906.  Serial No. 309,209.

*To all whom it may concern:*

Be it known that I, CLARENCE I. ZIMMERMAN, a citizen of the United States, residing at Niagara Falls, county of Niagara, State of New York, have invented certain new and useful Improvements in Electrolytic Condensers, of which the following is a specification.

This invention concerns the employment in electrolytic condensers of the well-known aluminum condenser type, of a class of electrolytes which afford a reliable operation during continuous or intermittent use, and in some instances allow much higher voltage limits than many of the electrolytes usually employed.

The accompanying drawing illustrates an electrolytic cell, at least one of the electrodes of which consists of aluminum.

The electrolytes comprise as essentials the aqueous solutions of ortho, meta and pyroboric acids, having the formulæ $B(OH)_3$, $BO(OH)$, $B_4O_5(OH)_2$, and their respective alkali and ammonium salts, for example, borax, sodium, pyro-borate, $Na_2B_4O_7$, either alone or in combination. The presence of glycerin has also been found advantageous in reducing corrosion of the electrode, particularly where the air and the electrolyte are in contact.

The type of condenser to which my improvement applies consists essentially of either one or two film-coated electrodes placed in an electrolyte capable of producing films by electrolytic action upon one or both of these electrodes. These films are extremely thin and are presumably a hydrated oxid of the material used for the electrode. The films serve as di-electrics, and as in the case of ordinary condensers, they hold the static charge. The electrolyte also serves as a conducting medium between the two electrodes.

The acid radical of the dissolved substance in the electrolyte must be capable of forming the film when the cell is in operation. The formation of the film will not occur unless certain portions of it are destroyed by corrosion or puncturing. The film grows to, or is maintained at a definite thickness, dependent upon the nature of the electrolyte and the pressure at the cell terminals. Abnormal growth is prevented by its own insulating properties.

A cell containing two electrodes, one of which is inert and the other of which is capable of producing and maintaining a film, can be used as a condenser only when the film-covered electrode is the anode. Such a cell may be used on circuits where the polarity is not reversed.

A cell containing two of the film-covered electrodes possesses all the properties of a static electrical condenser, for one or the other of the films holds the effective charge.

In addition to the general static condenser properties, the electrolytic condenser possesses properties peculiar to itself. It may be subjected to abnormal voltage without danger, for although its film may break down and allow a heavy leakage current to flow through the cell, the points of breakdown are quickly repaired when the voltage returns to its normal value. Owing to the presence of water, the cell possesses a great heat capacity and there is little danger connected with a temporary over-voltage with its consequent liberation of energy within the cell in the form of heat. Numerous electrolytes have been proposed for use in such condensers. Some of them are unsatisfactory because the composition of, or the growth of the film is such that the voltage which can be applied to the cell terminals is too small for practical purposes. Examples of these electrolytes are sulfates and chromates. Again, other electrolytes, such as the phosphates, are unsatisfactory because they attack the film or the metal electrode when the condenser is not in use.

The electrolytes which I propose, when free from chlorids, sulfates and other salts which corrode the electrode rapidly, can withstand high voltages and at the same time attack the film and the electrodes to only a very small extent. Just why this class of electrolytes is able to withstand higher voltages it is difficult to state, because the electrical, chemical, or electrochemical surface action between the liquid and the electrodes under the electric stress is not known definitely. The varying powers of the acid radicals of different substances which may be used in electrolytic condensers, to coagulate hydrated aluminum oxids which are supposed to be formed at the electrode surface, have been proposed as the cause of the differences observed in the limiting voltages of cells. It is possible, therefore, that the class of electrolytes which I here propose, has a greater ability to cause thicker and denser films to form than many other electrolytes. The relatively slight avidity or the inertness of the acids of boron is probably the reason for the small amount of corrosion of the film and electrodes when the condenser is not in use.

I have observed that the concentration of the solutions should preferably be as great as possible because the conductivity of the electrolytes is thereby increased. It is, however, possible to operate the condensers with electrolytes of widely varying concentrations and hence I do not limit their application to any one definite value.

The presence of glycerin and sugars that is, soluble carbo-hydrates has the effect of reducing corrosion at the electrodes and of increasing the efficiency of the cell. Glycerin in quantities up to thirty or forty per cent. makes ortho-boric acid more active. The reason for its effect here may be of a similar nature, i. e., in assisting any acid radical which is liberated at the electrode surface to be more active in producing a highly resistant film.

What I claim as new and desire to secure by Letters Patent of the United States, is;

1. In an electrolytic cell, an aluminum electrode, a coöperating electrode, and an electrolyte consisting of an aqueous solution containing an oxyacid of boron, borax and glycerin.

2. In an electrolytic cell, the combination of an aluminum electrode, a coöperating electrode, and an electrolyte containing a borate and a soluble carbo-hydrate.

3. In an electrolytic condenser, aluminum electrodes, and an electrolyte consisting of an aqueous solution containing an oxyacid of boron, a borate and glycerin.

4. In an electrolytic alternating-current rectifier, an electrolyte containing a substance for preventing oxids and precipitates forming and collecting in the cell.

5. In an electrolytic alternating-current rectifier, an electrolyte containing glycerin for preventing oxids and precipitates forming and collecting in the cell.

6. In an electrolytic cell having at least one aluminum electrode, an electrolyte containing glycerin for preventing oxids and precipitates forming and collecting in the cell.

7. In an electrolytic cell, having at least one electrode consisting of aluminum, an electrolyte containing glycerin and a compound of boron.

8. In an electrolytic cell, having at least one electrode consisting of aluminum, an electrolyte containing a borate and glycerin.

In witness whereof I have hereunto set my hand this twenty-seventh day of March, 1906.

CLARENCE I. ZIMMERMAN.

Witnesses:
   JESSIE B. McVEAN,
   ALFRED W. MAY.